United States Patent
Doerrich et al.

(10) Patent No.: US 12,043,704 B2
(45) Date of Patent: Jul. 23, 2024

(54) ALKYL SILICONE RESIN AS ADDITIVE FOR HYROPHOBISING FIBRE CEMENT

(71) Applicant: WACKER CHEMIE AG, Munich (DE)

(72) Inventors: Steffen Doerrich, Munich (DE); Georg Loessel, Emmerting (DE); Pedro Marani, Sao Paulo (BR); Daniel Schildbach, Helmstadt (DE); Volker Stanjek, Ampfing (DE)

(73) Assignee: WACKER CHEMIE AG, Munich (DE)

( * ) Notice: Subject to any disclaimer, the term of this patent is extended or adjusted under 35 U.S.C. 154(b) by 1038 days.

(21) Appl. No.: 16/963,213

(22) PCT Filed: Jan. 19, 2018

(86) PCT No.: PCT/EP2018/051358
§ 371 (c)(1),
(2) Date: Jul. 18, 2020

(87) PCT Pub. No.: WO2019/141377
PCT Pub. Date: Jul. 25, 2019

(65) Prior Publication Data
US 2021/0130550 A1    May 6, 2021

(51) Int. Cl.
| | |
|---|---|
| *C08G 77/18* | (2006.01) |
| *C04B 24/42* | (2006.01) |
| *C04B 28/04* | (2006.01) |
| *C08G 77/06* | (2006.01) |
| *C08G 77/24* | (2006.01) |
| *C04B 103/65* | (2006.01) |

(52) U.S. Cl.
CPC ............. *C08G 77/18* (2013.01); *C04B 24/42* (2013.01); *C04B 28/04* (2013.01); *C08G 77/06* (2013.01); *C08G 77/24* (2013.01); *C04B 2103/65* (2013.01)

(58) Field of Classification Search
CPC ..................................................... C08G 77/18
See application file for complete search history.

(56) References Cited

U.S. PATENT DOCUMENTS

| | | | |
|---|---|---|---|
| 4,476,191 A * | 10/1984 | Girgis | ........................ C08J 5/08 427/372.2 |
| 5,443,627 A | 8/1995 | Von Au et al. | |
| 6,294,608 B1 | 9/2001 | Hager et al. | |
| 2002/0086907 A1 | 7/2002 | Standke et al. | |
| 2006/0167297 A1 | 7/2006 | Schattenmann et al. | |
| 2014/0005433 A1 | 1/2014 | Stanjek et al. | |
| 2016/0208050 A1 * | 7/2016 | Klotzbach | ............... C08L 83/04 |
| 2017/0137677 A1 * | 5/2017 | Stanjek | ................ C08G 18/718 |
| 2017/0349709 A1 * | 12/2017 | Sandmeyer | ............ C08G 77/06 |
| 2018/0265640 A1 * | 9/2018 | Sandmeyer | ............ C08G 77/18 |

FOREIGN PATENT DOCUMENTS

| | | |
|---|---|---|
| DE | 4114498 A1 | 11/1992 |
| DE | 102011005581 A1 | 9/2012 |
| EP | 0908498 A1 | 4/1999 |
| EP | 1205505 B1 | 11/2005 |
| EP | 1686132 B2 | 3/2011 |
| EP | 3315474 A1 * | 5/2018 |
| WO | 2006016876 A1 | 2/2006 |

* cited by examiner

*Primary Examiner* — Marc S Zimmer
(74) *Attorney, Agent, or Firm* — BROOKS KUSHMAN P.C.

(57) ABSTRACT

Alkylsilicone resins containing at least 20 mol percent of siloxy units bearing a $>C_s$ alkyl group and having from 5-20 weight percent of alkoxy groups may be prepared directly by hydrolysis of chlorosilanes, and are highly effective as bulk hydrophobing agents in the preparation of fibrocement.

13 Claims, No Drawings

ALKYL SILICONE RESIN AS ADDITIVE FOR HYROPHOBISING FIBRE CEMENT

CROSS REFERENCE TO RELATED APPLICATIONS

This application is the U.S. National Phase of PCT Appln. No. PCT/EP2018/051358 filed Jan. 19, 2018, the disclosure of which is incorporated in its entirety by reference herein.

BACKGROUND OF THE INVENTION

1. Field of the Invention

The invention relates to an alkyl silicone resin (A), a continuous process for producing the alkyl silicone resin (A), a continuous process for the bulk hydrophobicization of fibrocement with alkyl silicone resin (A) and the use of alkyl silicone resin (A) for the bulk hydrophobicization of fibrocement.

2. Description of the Related Art

Silicon-organic compounds have long been used in building protection because of their excellent impregnating effect to repel water and dirt, their environmental friendliness, and their physiological acceptability.

Customary impregnants contain alkoxysilanes having a hydrophobic alkyl group, with alkyl groups having 8 carbon atoms, in particular n-octyl groups or 1,4,4-trimethyl-pentyl groups, being particularly widely used. Typical representatives of such hydrophobicizing silanes are n-octyltriethoxysilane and 1,4,4-trimethylpentyltriethoxysilane.

Most commercially available compositions for hydrophobicizing building materials contain not only the abovementioned silanes but also further silicon-organic compounds, in particular methyl silicone resins, linear polydimethylsiloxanes or else linear polydimethylsiloxanes modified with, for example, amino groups. The corresponding mixtures can be applied neat, as a solution in an organic solvent or as aqueous emulsion.

In principle, a distinction can be made between two application forms. In the first, an existing construction, e.g. a concrete bridge, a house façade or a roof tile is subsequently hydrophobicized by means of a coating formulation. Here, the coating material applied can also penetrate into the substrate, at least in the case of porous building materials, and thus produce at least a certain effect at depth. In contrast to paints or varnishes applied exclusively to the surface, minor surface damage does not inevitably lead to a loss of the hydrophobic protective effect. However, greater damage or drilled holes, cut edges, sawn or broken edges lead to a loss of the protective effect at the places concerned in the case of exclusively surface-impregnated materials.

While subsequent surface hydrophobicization is usually the only practical impregnation method for existing constructions, in the production of components based on hydraulic binders, e.g. concrete or fibrocement, the hydrophobicizing agent can be added before the setting process. This bulk hydrophobicization has the advantage that in this way the entire volume of the component and not only the surface thereof is provided with water-repellent protection. The protective action is thus not lost when the component is damaged or intentionally sawn or provided with drilled holes. In addition, bulk hydrophobicization saves the additional working step of subsequent coating of the cured component.

Among components to be hydrophobicized, fiber-reinforced cement composite materials ("fibrocements") are of particular importance.

To produce fibrocements, a highly diluted slurry of fibers and cement, usually conventional Portland cement, is generally firstly dewatered to give films having a thickness of about 0.3 mm and subsequently wound up on a roll to the desired thickness in each case. The rolled-up fibrocement layer is then cut up and flattened to give a flat plate which can then be cut to the shape and size desired in each case. Curing can be carried out over a number of days (typically 1-2 weeks) in air or significantly more quickly at elevated temperatures by means of autoclaving. In the latter process, 40-60% of sand can also be added to the fibrocement; at the elevated autoclave temperatures, this sand reacts with the excess of lime in the cement to form calcium-silicon dioxide hydrates.

Fibers used are first and foremost asbestos, cellulose, polyvinyl acetate (PVA), polyvinyl alcohol (PVOH) or polypropylene (PP) fibers. However, carbon and polyacrylonitrile fibers can also be used. Asbestos fibers in particular have a number of advantages in respect of their properties since they are not only strong and stiff but as inorganic materials can also bond strongly to the cement matrix. Unlike cellulose fibers, for example, asbestos fibers also cannot rot.

However, owing to the hazard to health posed by asbestos, this fiber material is being used to a decreasing extent, especially in Western industrial states; the corresponding products have already completely disappeared in Europe and North America. Nevertheless, more than 50% of the fibrocement sheets used worldwide still contain asbestos fibers.

As alternatives which are not harmful to health, combinations of cellulose fibers with PVA, PVOH, PP or PET fibers are usually employed in the case of fibrocement sheets which are not autoclaved. Since PVA, PP and also PET are destroyed by the autoclaving step, exclusively cellulose is generally used as an alternative to asbestos in this process. However, since fibrocement sheets without PVA, PP, PET and asbestos have only moderate mechanical properties, autoclaved products are used in Europe and America primarily for cladding exterior walls, while unautoclaved products are usually employed for load-bearing wall or roof elements.

For exterior applications in particular, hydrophobicized fibrocement sheets are being used to an increasing extent with the trend being away from subsequent coating to bulk hydrophobicization because of the above-described advantages.

Here, the bulk hydrophobicization of fibrocement components using formulations containing alkoxysilanes having a hydrophobic alkyl group in addition to other constituents has been known for a long time and was described as early as 1991 in DE 4114498.

However, a disadvantage of the use of alkoxysilanes is, inter alia, the large amount of alcohol which is liberated by the hydrolysis of the alkoxysilyl groups during use of the silanes.

In the case of the abovementioned alkyltriethoxysilanes, whose alkyl group contains 8 carbon atoms, the weight of ethanol liberated corresponds to almost exactly 50% of the amount of silane used.

This represents a great problem, especially in the bulk hydrophobicization of fibrocement, since, as described, a highly diluted slurry of fibers and cement is dewatered there. To avoid excessive amounts of wastewater, the process water separated off during dewatering is generally recirculated to the process. If a silane is used for bulk hydrophobicization, the readily water-soluble alcohol liberated remains in the process water and thus accumulates ever further with each cycle of the water recirculated to the process and would be able to be removed only by technically very complicated methods which are in reality not really practicable for cost reasons.

In addition, it has been found that monomeric alkylalkoxysilanes have only a moderately good effect when used for bulk hydrophobicization.

As an improvement, WO 2006/016876 has proposed that the alkylsilanols which can be prepared from alkylalkoxysilanes by hydrolysis be used instead of the silanes. However, this procedure has the disadvantage that silanols are storage-stable, and thus also transportable, only in very high dilution. However, transport in such a high dilution is economically unattractive, and preparation of silanol solutions on site at the producer of fibrocement sheets is usually not possible because of a lack of plants for carrying out this chemical process step.

It was therefore an object of the invention to provide a product for bulk hydrophobicization of fibrocement, which no longer has the disadvantages of the materials described in the prior art or at least has them to only a considerably reduced extent.

SUMMARY OF THE INVENTION

The invention provides an alkyl silicone resin (A) containing at least 80% by weight of units of the general formula I

$$R^1_a(R^2O)_b R^3_c SiO_{(4-a-b-c)/2} \quad (I)$$

where the radicals $R^1$ and $R^2$ are lower alkyl groups and $R^3$ are $>C_5$ alkyl groups, present in a relatively high concentration where c=1 in at least 20% of the units, and the resin contains 5-20 weight percent of alkoxy groups.

The invention thus provides an alkyl silicone resin (A) containing at least 80% by weight of units of the general formula I

$$R^1_a(R^2O)_b R^3_c SiO_{(4-a-b-c)/2} \quad (I)$$

wherein $R_1$ can be identical or different and are each a monovalent, SiC-bonded, unsubstituted or substituted aliphatic hydrocarbon radical having not more than 4 carbon atoms, $R^2$ can be identical or different and are each a monovalent, unsubstituted or substituted hydrocarbon radical having not more than 4 carbon atoms, $R^3$ can be identical or different and are each a monovalent, SiC-bonded, unsubstituted or substituted hydrocarbon radical having at least 5 carbon atoms, a is 0, 1, 2 or 3, preferably 0 or 1, b is 0, 1, 2 or 3, preferably 0, 1 or 2, and c is 0, 1 or 2, preferably 0 or 1, with the proviso that the sum of a+b+c is less than or equal to 3 and in at least 50% of the units of the formula (I) the sum a+b is 0 or 1 and in at least 20% of the units of the general formula (I) c is 1, where the content of alkoxy groups $R^2O$ is 5-20% by weight.

The invention is based on the surprising discovery that the alkyl silicone resins (A) of the invention are, despite their high molecular weight character, not only able to replace monomeric alkylalkoxysilanes in the use for bulk hydrophobicization of fibrocement but even display an improved hydrophobicizing action.

The invention also provides a process for the bulk hydrophobicization of fibrocement, wherein a mixture containing water, fibers, cement and alkyl silicone resin (A) is produced, and for the use of alkyl silicone resin (A) for the bulk hydrophobicization of fibrocement.

As radicals $R^1$, preference is given to unsubstituted radicals, i.e. alkyl radicals such as methyl, ethyl, n-propyl, isopropyl, 1-n-butyl, 2-n-butyl, isobutyl, and tert-butyl radicals, with methyl and ethyl radicals being particularly preferred and the methyl radical being most preferred.

Examples of radical $R^2$ are the meanings given for radical $R^1$. Radicals $R^2$ are preferably optionally halogen-substituted alkyl radicals having from 1 to 4 carbon atoms, in particular the methyl and ethyl radicals.

The radicals $R^3$ are preferably unsubstituted cyclic, branched or unbranched alkyl groups having from 6 to 18 carbon atoms. Examples of radicals $R^3$ are n-hexyl, cyclohexyl, n-octyl, 1,4,4-trimethylpentyl, decyl, dodecyl, tetradecyl, hexadecyl, or octadecyl radicals.

The radicals $R^3$ are more preferably alkyl groups having from 8 to 16 carbon atoms, in particular n-octyl, 1,4,4-trimethylpentyl, or n-hexadecyl radicals.

The alkyl silicone resins (A) preferably contain at least 90% by weight of units of the general formula (I). Component (A) most preferably consists exclusively of units of the general formula (I).

In the alkyl silicone resins (A), preference is given to at least 90 mol % of all radicals $R^1$ being methyl radicals. In the alkyl silicone resins (A), preference is given to at least 90 mol % of all radicals $R^2$ being methyl, ethyl, propyl or isopropyl radicals. In the alkyl silicone resins (A), preference it is given to at least 90 mol % of all radicals $R^3$ being unsubstituted alkyl groups having from 8 to 16 carbon atoms.

Preference is given to using alkyl silicone resins (A) which comprise at least 40%, more preferably at least 60%, of units of the general formula (I) in which a is 0 and c is 1, in each case based on the total number of units of the general formula (I). In a particular embodiment of the invention, it is possible to use alkyl silicone resins (A) which have exclusively units of the formula (I), in which a is 0 and c is 1.

In an embodiment of the invention, use is made of alkyl silicone resins (A) which, in each case based on the total number of units of the general formula (I), comprise not more than 50%, more preferably not more than 40%, and most preferably not more than 20%, of units of the general formula (I) in which a is 2.

Preference is given to alkyl silicone resins (A) which, in each case based on the total number of units of the general formula (I), comprise from 8 to 65%, in particular from 10 to 45%, most preferably from 12 to 16%, of units of the general formula (I) in which b is 0.

Preference is given to alkyl silicone resins (A) which, in each case based on the total number of units of the general formula (I), comprise from 30 to 70%, in particular from 45 to 63%, of units of the general formula (I) in which b is 1.

Preference is given to alkyl silicone resins (A) which, in each case based on the total number of units of the general formula (I), comprise from 5 to 45%, in particular from 22 to 40%, of units of the general formula (I) in which b is 2.

Preference is given to alkyl silicone resins (A) which, in each case based on the total number of units of the general formula (I), comprise from 0 to 5%, more preferably from 0 to 2%, and in particular from 0 to 1%, of units of the general formula (I) in which b is 3.

Preference is given to using alkyl silicone resins (A) which, in each case based on the total number of units of the general formula (I), comprise at least 80% of units of the formula (I) in which the sum a+c is 1.

Examples of alkyl silicone resins (A) are organopolysiloxane resins which consist essentially, preferably exclusively, of (Q) units of the formulae $SiO_{4/2}$, $Si(OR^4)O_{3/2}$, $Si(OR^4)_2O_{2/2}$ and $Si(OR^4)_3O_{1/2}$, (T) units of the formulae $Alk\text{-}SiO_{3/2}$, $Alk\text{-}Si(OR^4)O_{2/2}$ and $Alk\text{-}Si(OR^4)_2O_{1/2}$, $Me\text{-}SiO_{3/2}$, $Me\text{-}Si(OR^4)O_{2/2}$ and $Me\text{-}Si(OR^4)_2O_{1/2}$, (D) units of the formulae $Me_2SiO_{2/2}$ and $Me_2Si(OR^4)O_{1/2}$ and also (M) units of the formula $Me_3SiO_{1/2}$, where Me is a methyl radical, Alk is an unsubstituted alkyl radical having from 8 to 16 carbon atoms and $R^4$ is an alkyl radical having from 1 to 4 carbon atoms, where the resin preferably contains 0-2 mol of (Q) units, 0-2 mol of (D) units and 0-2 mol of (M) units per mole of (T) units.

Preferred examples of alkyl silicone resins (A) are organopolysiloxane resins which consist essentially, preferably exclusively, of T units of the formulae $AlkSiO_{3/2}$, $AlkSi(OR^4)O_{2/2}$ and $AlkSi(OR^4)_2O_{1/2}$ and also T units of the formulae $MeSiO_{3/2}$, $MeSi(OR^4)O_{2/2}$ and $MeSi(OR^4)_2O_{1/2}$ and also D units of the formulae $Me_2SiO_{2/2}$ and $Me_2Si(OR^4)O_{1/2}$, where Me, Alk and $R^4$ have the abovementioned meanings and the molar ratios of (T) to (D) units are in the range from 1.0 to 10.0.

Further preferred examples of alkyl silicone resins (A) are organopolysiloxane resins which consist essentially, preferably exclusively, of T units of the formulae $AlkSiO_{3/2}$, $AlkSi(OR^4)O_{2/2}$ and $AlkSi(OR^4)_2O_{1/2}$ and also T units of the formulae $MeSiO_{3/2}$, $MeSi(OR^4)O_{2/2}$ and $MeSi(OR^4)_2O_{1/2}$, where Me, Alk and $R^4$ have the abovementioned meanings, in a molar ratio of Alk to Me units of from 0.5 to 4.0.

Additional preferred examples of alkyl silicone resins (A) are organopolysiloxane resins which consist essentially, preferably exclusively, of T units of the formulae $AlkSiO_{3/2}$, $AlkSi(OR^4)O_{2/2}$ and $AlkSi(OR^4)_2O_{1/2}$, where Alk and $R^4$ have the abovementioned meanings.

Very particularly preferred examples of alkyl silicone resins (A) are organopolysiloxane resins which have one of the compositions described in the previous four paragraphs, where the radicals Alk are n-octyl, 1,4,4-trimethylpentyl or n-hexadecyl radicals, in particular n-octyl or 1,4,4-trimethyl-pentyl radicals.

The alkyl silicone resins (A) preferably have an average molar mass (number average) $M_n$ of at least 400 g/mol and more preferably at least 600 g/mol. The average molar mass $M_n$ is preferably not more than 400,000 g/mol, more preferably not more than 10,000 g/mol, and in particular not more than 1500 g/mol, as determined by means of GPC: Iso Pump Agilent 1200 instrument, autosampler Agilent 1200, column oven Agilent 1260, detector RID Agilent 1200, column Agilent 300×7.5 mm OligoPore exclusion 4500D, column material highly crosslinked polystyrene/divinylbenzene, 25 eluent toluene, flow rate 0.7 ml/min, injection volume 10 μl, concentration 1 g/l (in toluene), PDMS (polydimethylsiloxane) calibration (Mp 28500 D, Mp 25200 D, Mp 10500 D, Mp 5100 D, Mp 4160 D, Mp 1110 D, Mp 311D).

The alkyl silicone resins (A) can be either solid or liquid at 23° C. and 1000 hPa, with the alkyl silicone resins (A) preferably being liquid. The silicone resins (A) preferably have a viscosity of from 10 to 100,000 mPas, more preferably from 50 to 1000 mPas, and in particular from 100 to 500 mPas.

For the purposes of the present invention, the viscosity is determined using a DV 3 P rotary viscometer from A. Paar (Brookfield system) with spindle 5 at 2.5 rpm in accordance with ISO 2555 after bringing to a temperature of 23° C.

In a preferred embodiment of the invention, the alkyl silicone resins (A) are not produced by hydrolysis of the corresponding alkylalkoxysilanes but instead by reaction of the corresponding alkylchlorosilanes with alcohol and water.

In a very particular embodiment of the invention, the alkyl silicone resins (A) are produced in a continuous process from the corresponding alkylchlorosilanes, alcohol and water.

The alkyl silicone resins (A) of the invention are preferably produced in a continuous process in which one or optionally more chlorosilanes of the general formula (II),

$$R^1_a R^3_c SiCl_{(4-a-b)} \qquad (II),$$

one or optionally more alcohols of the general formula (III)

$$R^2OH \qquad (III)$$

and water are reacted, where all variables have the general and preferred meanings indicated above.

Such continuous processes are known per se. However, these processes have hitherto not been used for producing alkyl silicone resins (A) according to the invention which have the long-chain alkyl groups.

The reaction is carried out in a reaction column in which the alcohol and the water are introduced in the lower part of the column and are vaporized there, while the alkylchlorosilane(s) are fed in in the upper part of the column. In accordance with the countercurrent principle, the liquid mixture composed of the alkylchlorosilanes used and the alkyl silicone resins formed in the reaction column then flows downward in the column, while alcohol, water and the hydrogen chloride formed in the reaction travel in the gaseous state upward through the column. Very high conversions can be achieved in this way since a large excess of water and alcohol is present in the lower part of the column and reacts with even small residues of remaining silicon-bonded chlorine, while a large excess of chlorosilane exists in the upper part of the column and reacts immediately with every water or alcohol molecule still present.

The reaction is preferably carried out at temperatures in the range from 60 to 150° C., more preferably at temperatures in the range from 80 to 120° C.

Water/alcohol is preferably used in a ratio (by weight) of from 1:0.2 to 1:1, more preferably in a ratio (by weight) of from 1:0.4 to 1:0.8, in the reaction.

An organic solvent can optionally also be concomitantly employed, with all organic solvents being possibilities. Preference is given to using unreactive organic solvents, e.g. toluene or xylene.

The reaction can optionally take place not only in a single column but also in two columns connected in series. In this case, the chlorosilane used and the silicone resin (A) formed is conveyed downward from the top of the first column, with the bottoms from this column then being discharged and transferred into the upper region of the second column. There too, the silane then moves downward so that the finished and ideally largely chloride-free product having a chloride content of preferably <50 ppm can then be obtained from the bottom of the second column. As in the single-column process, the gaseous mixture of alcohol, water and hydrochloric acid formed here also travels in precisely the opposite direction from the bottom of column 2 to the top thereof, in order then to be transferred to the bottom of the first column and ascend in gaseous form through this column to the top.

The second column is optionally only a "stripping column" in which small residues of hydrogen chloride or silicon-bonded chloride still present at the bottom of the first column are removed from the product mixture by a large excess of water and alcohol vaporized in the bottom part of the column.

In this process, the column or columns can optionally also be preceded by a prereactor in which the chlorosilane precursor is reacted with part of the water and/or alcohol to be used to give a partially alkoxylated and/or partially condensed intermediate, before this intermediate is then converted into the finished end product in the actual reaction column or reaction columns.

The prereactor can, for example, consist of a stirred vessel, a tube reactor or a loop reactor. Preference is given to a maximum of 80% of the molar silicon-bonded chlorine units being reacted with alcohol and/or water in the prereactor. The mixture obtained is then preferably fed into the reaction column at the top, or in the case of two reaction columns at the top of the first column, in which column(s) the reaction is then completed.

The hydrogen chloride obtained in the overall process is preferably freed of condensable constituents which are in turn recirculated to the process. The hydrogen chloride is thus available as gas for recovery and further utilization.

The alcohol to be used and the water to be used can in principle be introduced into all reaction units present. However, the main amount is preferably introduced into the bottom region of the reaction column, or in the case of two reaction columns into the bottom region of the second column, in order to free the crude product in countercurrent of all volatile constituents, in particular adhering hydrogen chloride residues, and possibly bring about an after-reaction of silicon-bonded chlorine units still present.

If a prereactor is used, water still present and alcohol still present are condensed at the top of the reaction column, or in the case of two reaction columns at the top of the second column, and subsequently transferred into the prereactor.

The continuous process of the invention is preferably carried out in a plant comprising a prereactor and two columns.

A corresponding process and corresponding plant are known, for example, from EP 1686132.

In the process for the bulk hydrophobicization of fibrocement, a mixture containing water, fibers, cement and alkyl silicone resin (A) is produced.

The above-described continuous process starting out from chloroalkylsilanes gives alkyl silicone resins (A) which differ significantly in terms of the composition of T units (Alk-SiO$_{3/2}$) or (Me-SiO$_{3/2}$)), D units (Alk-Si(OR$^4$)O$_{2/2}$ or Me-Si(OR$^4$)O$_{2/2}$) and M units (Alk-Si(OR$^4$)$_2$O$_{1/2}$ or Me-Si(OR$^4$)$_2$O$_{1/2}$) from products which have been obtained by other processes, e.g. hydrolysis of the corresponding alkoxysilanes.

It has surprisingly been found that when the alkyl silicone resins (A) produced by the above-described particularly inexpensive continuous process are used for the bulk hydrophobicization of fibrocement, they lead to better results than chemically similar, but not identical, products which can be produced by other processes.

An additive (ADD) which contains alkyl silicone resins (A) or consists exclusively of one or more alkyl silicone resins (A) is preferably used in the bulk hydrophobicization.

These further constituents can be, for example, monomeric silanes (S) of the general formula IV

$$R^1{}_a(R^2O)_{4-a-c}R^3{}_cSi \quad (IV),$$

where all variables have the meanings indicated above.

When monomeric silanes (S) of the formula (IV) are present in the additive (ADD), the amounts thereof are preferably not more than 10 parts by weight, more preferably not more than 5 parts by weight, and in particular not more than 1 part by weight, in each case based on 100 parts by weight of component (A). The lower limit for the content of silanes (S) is 0 parts by weight in all preferred embodiments.

Other silanes or partial hydrolysates thereof, e.g. aminosilanes or water-scavenging silanes, can also be added. Examples of aminosilanes which are optionally added are H$_2$N(CH$_2$)$_3$—Si(OCH$_3$)$_3$, H$_2$N(CH$_2$)$_3$—Si(OC$_2$H$_5$)$_3$, H$_2$N(CH$_2$)$_3$—Si(OCH$_3$)$_2$CH$_3$, H$_2$N(CH$_2$)$_3$—Si(OC$_2$H$_5$)$_2$CH$_3$, H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, H$_2$N(CH$_2$)$_2$NH(CH$_2$)$_3$—Si(OC$_2$H$_5$)$_2$CH$_3$, H$_2$N(CH$_2$)$_2$NH(CH$_2$)$_3$—Si(OH)$_3$, H$_2$N(CH$_2$)$_2$NH(CH$_2$)$_3$—Si(OH)$_2$CH$_3$, H$_2$N(CH$_2$)$_2$NH(CH$_2$)$_2$NH(CH$_2$)$_3$—Si(OCH$_3$)$_3$, H$_2$N(CH$_2$)$_2$NH(CH$_2$)$_2$NH(CH$_2$)$_3$—Si(OC$_2$H$_5$)$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, cyclo-C$_6$H$_{11}$NH(CH$_2$)$_3$—Si(OCH$_3$)$_2$CH$_3$, cyclo-C$_6$H$_{11}$NH(CH$_2$)$_3$—Si(OC$_2$H$_5$)$_2$CH$_3$, cyclo-C$_6$H$_{11}$NH(CH$_2$)$_3$—Si(OH)$_3$, cyclo-C$_6$H$_{11}$NH(CH$_2$)$_3$—Si(OH)$_2$CH$_3$, phenyl-NH(CH$_2$)$_3$—Si(OCH$_3$)$_3$, phenyl-NH(CH$_2$)$_3$—Si(OC$_2$H$_5$)$_3$, phenyl-NH(CH$_2$)$_3$—Si(OCH$_3$)$_2$CH$_3$, phenyl-NH(CH$_2$)$_3$—Si(OC$_2$H$_5$)$_2$CH$_3$, phenyl-NH(CH$_2$)$_3$—Si(OH)$_3$, phenyl-NH(CH$_2$)$_3$—Si(OH)$_2$CH$_3$, HN((CH$_2$)$_3$—Si(OCH$_3$)$_3$)$_2$, HN((CH$_2$)$_3$—Si(OC$_2$H$_5$)$_3$)$_2$HN((CH$_2$)$_3$—Si(OCH$_3$)$_2$CH$_3$)$_2$, HN((CH$_2$)$_3$—Si(OC$_2$H$_5$)$_2$CH$_3$)$_2$, cyclo-C$_6$H$_{11}$NH(CH$_2$)—Si(OCH$_3$)$_3$, cyclo-C$_6$H$_{11}$NH(CH$_2$)—Si(OC$_2$H$_5$)$_3$, cyclo-C$_6$H$_{11}$NH(CH$_2$)—Si(OCH$_3$)$_2$CH$_3$, cyclo-C$_6$H$_{11}$NH(CH$_2$)—Si(OC$_2$H$_5$)$_2$CH$_3$, cyclo-C$_6$H$_{11}$NH(CH$_2$)—Si(OH)$_3$, cyclo-C$_6$H$_{11}$NH(CH$_2$)—Si(OH)$_2$CH$_3$, phenyl-NH(CH$_2$)—Si(OCH$_3$)$_3$, phenyl-NH(CH$_2$)—Si(OC$_2$H$_5$)$_3$, phenyl-NH(CH$_2$)—Si(OCH$_3$)$_2$CH$_3$, phenyl-NH(CH$_2$)—Si(OC$_2$H$_5$)$_2$CH$_3$, phenyl-NH(CH$_2$)—Si(OH)$_3$ and phenyl-NH(CH$_2$)—Si(OH)$_2$CH$_3$ and partial hydrolysates thereof.

Examples of water-scavenging silanes which are optionally added are silanes such as vinyltrimethoxysilane, vinyltriethoxy-silane, vinylmethyldimethoxysilane, tetraethoxysilane, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, and/or partial condensates thereof.

Further additives such as emulsifiers, catalysts, biocides or further hydrophobicizing components such as long-chain fatty acids, methyl silicone resins or silicone oils can also be present in the additive (ADD).

However, in a preferred embodiment the additive (ADD) is free of aminosilanes, water-scavenging silanes, catalysts, biocides or further hydrophobicizing components. If emulsifiers are present, they are preferably present in amounts of less than 20 parts by weight, particularly preferably less than 10 parts by weight, in each case based on 100 parts by weight of alkyl silicone resin (A).

In one embodiment, the additive (ADD) is an organic solution containing the alkyl silicone resins (A) and optionally further constituents. As solvent (L), it is possible to use all known organic solvents having a boiling point of <250° C. at 1013 mbar.

Examples of solvents (L) which are optionally used are ethers such as diethyl ether, methyl t-butyl ether, ether derivatives of glycol and THF; esters such as ethyl acetate, butyl acetate and glycol esters; aliphatic hydrocarbons such as pentane, cyclopentane, hexane, cyclohexane, heptane, octane or longer-chain branched and unbranched alkanes; ketones such as acetone and methyl ethyl ketone; aromatics such as toluene, xylene, ethylbenzene and chlorobenzene; or alcohols such as methanol, ethanol, glycol, propanol, isopropanol, glycerol, butanol, isobutanol and t-butanol.

In a further embodiment, the additive (ADD) is an aqueous emulsion containing alkyl silicone resins (A), at least one emulsifier and optionally further constituents. Suitable emulsifiers are described, for example, in EP 0908498 (A2), paragraphs?[0045] to [0049].

If the additive (ADD) is neither a solution comprising an organic solvent nor an aqueous suspension, the content of alkyl silicone resins (A) in the additive (ADD) is preferably at least 30% by weight, more preferably at least 50% by weight, and in particular at least 80% by weight. The upper limit is 100% by weight in all preferred embodiments.

If the additive (ADD) is a solution comprising an organic solvent or an aqueous suspension, the content of alkyl silicone resins (A) in the additive (ADD) is preferably at least 10% by weight, more preferably at least 25% by weight, and in particular at least 40% by weight. The upper limit is in this case preferably not more than 90% by weight, more preferably not more than 75% by weight, and in particular not more than 65% by weight.

In the bulk hydrophobicization, the additive (ADD) is preferably added to the highly diluted slurry of fibers and cement and optionally further constituents of the fibrocement sheet. Under the strongly basic conditions prevailing in the diluted slurry, hydrolysis of the alkyl silicone resins (A) of the invention occurs and these subsequently react with the surfaces of the solid particles present in the cement slurry and can hydrophobicize these particles.

The additive (ADD) is preferably used in amounts of at least 0.01 part by weight, more preferably at least 0.05 part by weight, and in particular at least 0.1 part by weight, in each case based on 100 parts by weight of cement used. At the same time, the additive (ADD) is preferably used in amounts of not more than 5 parts by weight, more preferably not more than 1 part by weight, and in particular not more than 0.5 part by weight, in each case based on 100 parts by weight of cement used.

The cement used is preferably Portland cement. As fibers, preference is given to using asbestos, cellulose, PVA, PVOH, PP or PET fibers. Further constituents of the fibrocement formulation can be sand, limestone or further fillers such as silica.

The additives (ADD) have the advantage of being able to eliminate only comparatively little alcohol in the hydrolysis, which alcohol could optionally remain in the process water separated off after the above-described addition to the cement slurries.

At the same time, the additive (ADD) has the advantage of having a particularly good hydrophobicizing action which is surprisingly significantly superior to the hydrophobicizing action of the corresponding monomeric silanes.

A further advantage of the additive (ADD) is the ability of the alkyl silicone resins (A) present in the additive (ADD) to be produced simply and inexpensively by means of a continuous production process.

Further advantages of the additive (ADD) according to the invention are its good storage stability and its ability to be used in a simple way.

In the examples described below, all viscosity values indicated are based on a temperature of 23° C. Unless indicated otherwise, the examples below are carried out at a pressure of the surrounding atmosphere, i.e. at about 1000 hPa, and at room temperature, i.e. at about 23° C., or at a temperature which is established on combining the reactants at room temperature without additional heating or cooling, and also at a relative atmospheric humidity of about 50%.

Furthermore, all parts and percentages indicated are, unless indicated otherwise, by weight.

EXAMPLES

Production Example 1: Production of a Silicone Resin According to the Invention Having 1,4,4-Trimethylpentyl Groups The continuous production process for the silicone resin of the invention is carried out using a double-column plant which consists of a first reaction column which has a length of 4.4 m and a diameter of 50 mm and is filled with ceramic packing elements (ceramic saddles) having a size of 0.5 inch, and an identical stripping second column. The liquid-phase volume of each of the columns is 2000 ml. The throughput of starting material in each experiment is 9-10 kg of 1,4,4-trimethylpentyltrichlorosilane. The residence time is from 60 to 70 minutes.

Over a period of 6 hours, 9.00 kg of 1,4,4-trimethylpentyltrichlorosilane are supplied at a metering rate of 1500 g/h to the top of the first column. At the same time, 1.18 kg of ethanol at a metering rate of 197 g/h and 0.72 kg of water (demineralized) at a metering rate of 120 g/h are each introduced into the bottom of the first column. At the same time and likewise over a period of 6 hours, 0.24 kg of ethanol are introduced at a metering rate of 40 g/h into the bottom of the second column.

The overhead distillate from the first column is recirculated to the top of the first column. The overhead distillate from the second column is recirculated to the bottom of the first column. The temperature at the bottom of the column 1 is 85° C. (+/−4° C.). The temperature at the bottom of the second column 2 is 114° C. (+/−4° C.). The starting materials thus react according to the countercurrent principle to give the desired product which is obtained as a solution in ethanol.

The crude product produced in this way is neutralized with a solution of 30% of sodium methoxide in methanol, filtered and freed of low boilers, e.g. ethanol, by distillation.

The treated product (resin 1) contains less than 20 ppm of HCl. It is analyzed by means of $^1$H/$^{29}$Si NMR and by GPC. The determination of the viscosity is carried out as described above. The data obtained are shown in table 1.

Production Example 2: Production of a Silicone Resin Having 1,4,4-Trimethylpentyl Groups The same plant as in production example 1 is used.

Over a period of 7 hours, 10 kg of 1,4,4-trimethylpentyl-trichlorosilane are supplied at a metering rate of 1500 g/h to the top of the first column. At the same time and likewise over a period of 6 hours, 1.38 kg of ethanol at a metering rate of 197 g/h and 1.38 kg of water (demineralized) at a metering rate of 197 g/h are each introduced into the bottom of the first column. At the same time and likewise over a period of 6 hours, 0.30 kg of ethanol are introduced at a metering rate of 43 g/h into the bottom of the second column.

The overhead distillate from the first column is recirculated to the top of the first column. The overhead distillate from the second column is recirculated into the bottom of the first column. The temperature at the bottom of the first column is 80° C. (+/−2° C.). The temperature at the bottom of the second column is 106° C. (+/−2° C.). The starting materials thus react according to the countercurrent principle to give the desired product which is obtained as a solution in ethanol.

The crude product produced in this way is neutralized with a solution of 30% of sodium methoxide in methanol, filtered and freed of low boilers, e.g. ethanol, by distillation.

The treated product (resin 2) contains less than 20 ppm of HCl. It is analyzed by means of $^1$H/$^{29}$Si NMR and by GPC. The determination of the viscosity is carried out as described above. The data obtained are shown in table 1.

TABLE 1

| Parameter determined | Analytical method used | Resin 1 | Resin 2 |
|---|---|---|---|
| Ratio of water/EtOH used [mol/mol] | | 1:0.77 | 1:0.48 |
| Content of alkoxy groups [% by weight] | $^1$H-NMR | 10.4 | 10.6 |
| Content of —Si(OEt)$_3$ [mol %] | $^{29}$Si-NMR | 0.4 | 0.0 |
| Content of —Si(OEt)$_2$O$_{1/2}$ [mol %] | $^{29}$Si-NMR | 26.2 | 24.1 |
| Content of —Si(OEt)O$_{2/2}$ [mol %] | $^{29}$Si-NMR | 61.1 | 60.4 |
| Content of —SiO$_{3/2}$ [mol %] | $^{29}$Si-NMR | 12.3 | 15.5 |
| Viscosity [MPas] | s.a. | 153 | 198 |
| Mn [g/mol] | GPC | 1000 | 1087 |
| Mw [g/mol] | GPC | 1100 | 1195 |

Materials Used

Fiber slurries (5% cellulose fibers 95% water): 90% of the fiber strands have a length of 1-6 mm and a diameter of 10-40 μm (+−5 μm). The fibers are present both individually and as bundles. The individual fiber strands are partly frayed further in some places.

Synthetic PP fibers: Diameter 18 μm (+−3 μm), length 6 mm (+−1 mm).

Lime: Nekafill® 15, Kalkfabrik Netstal AG; composition: 91.9% of CaCO$_3$, 5.4% of MgCO$_3$, sieve analysis residue (sieve 0.500 mm 0.0%, sieve 0.125 mm 1.9%, sieve 0.063 mm 18.7%).

Quartz flour: Amberger Kaolinwerke, Eduard Kick GmbH & Co. KG, type 16.900, dry sieve residue (DIN EN 933-10) 2% by weight >40 μm mesh opening.

Cement: Portland cement OPC type II-F (ASTM C150 (Standard Specification for Portland Cement)).

Filter paper: Whatman® Quantitative Filter Paper (Article No., 28414113 (US reference)), ashless, Grade 589/2 white ribbon, circles, diameter 90 mm, thickness 180 μm, pore size 4-12 μm, weight 85 g/m2.

Apparatus Used

Blade stirrer: IKA RW20
Pressing mold:
Ring (VA Steel):
Internal diameter: 80 mm
External diameter: 100 mm
Height: 40 mm
Cylinder (Aluminum):
Diameter: 79-80 mm
Height: 60 mm
Ring markings between height of 18 mm to 24 mm for visual assessment of the immersion depth.
Bottom Plate (VA Steel):
Total diameter: 100 mm
Total height: 30 mm
Groove 10 mm×10 mm milled in from above. Groove accommodates ring.
Press: hydraulic cylinder press up to 180 bar max.

Air conditioned room: The room for conditioning of the test specimens has a temperature of 23° C. at 50% rel. atmospheric humidity.

Drying oven: UF 110 from Memmert.

Example C1 (not According to the Invention): Production of an Unautoclaved Fibrocement Sheet to which an Additive has not been Added Water (2500 g), synthetic PP fibers (0.75 g), lime (7.5 g) and cement (39.25 g) are added in succession to a 5% strength fiber slurry (50 g) while stirring (1500 rpm, 15 minutes). The resulting mixture is subsequently stirred at 1500 rpm for 2 hours. The resulting mixture is filtered through a filter paper in a porcelain suction filtration funnel (diameter 10 cm) under a water pump vacuum.

The still moist residue is subsequently distributed in a metal pressing mold and pressed at 100 bar. The resulting fibrocement sheet is detached from the mold and subsequently stored for 2 weeks in an air conditioned chamber. The fibrocement sheet obtained has a density of 1.50 g/ml.

Example C2 (not According to the Invention): Production of an Unautoclaved Fibrocement Sheet to which Monomeric 1,4,4-Trimethylpentyltriethoxysilane has been Added as Additive Water (2500 g), synthetic PP fibers (0.75 g), lime (7.5 g), cement (39.25 g) and 1,4,4-trimethylpentyltriethoxysilane (0.1 g) are added in succession to a 5% strength fiber slurry (50 g) while stirring (1500 rpm, 15 minutes). The resulting mixture is subsequently stirred at 1500 rpm for 2 hours. Further processing is carried out as described in Example 1. The fibrocement sheet obtained has a density of 1.51 g/ml.

Example C3 (not According to the Invention): Production of an Unautoclaved Fibrocement Sheet to which Monomeric n-OctylTriethoxysilane has been Added as Additive The procedure of Example 2 is repeated, but the 0.1 g of 1,4,4-trimethylpentyltriethoxysilane is replaced by the same amount of n-octyltriethoxysilane. The fibrocement sheet obtained has a density of 1.45 g/ml.

Example 4 (According to the Invention): Production of an Unautoclaved Fibrocement Sheet to which Resin 1 has been Added as Additive The procedure of Example 2 is repeated, but the 0.1 g of 1,4,4-trimethylpentyltriethoxysilane is replaced by the same amount of resin 1 from production example 1. The fibrocement sheet obtained has a density of 1.45 g/ml.

Example 5: Determination of the Water Absorption of Fibrocement Sheets

The fibrocement sheets obtained in Examples 1 to 4 are dried to constant mass at 40° C. for 24 hours in a drying oven. The water absorption is subsequently determined by means of storage in water under pressure in accordance with DIN EN 520. The results of these measurements are shown in Table 2.

TABLE 2

|  | Example C1* | Example C2* | Example C3* | Example 4 |
|---|---|---|---|---|
| Water absorption after 2 h [% by weight] | 26.0 | 19.5 | 19.3* | 1.9 |
| Reduction in the water absorption after 2 h [%] |  | 25.0 | 25.8 | 92.9 |
| Water absorption after 24 h [% by weight] | 27.8 | 23.1 | 23.0 | 4.3 |
| Reduction in the water absorption after 24 h [%] |  | 16.9 | 17.3 | 84.5 |

*not according to the invention

Example C6 (not According to the Invention): Production of an Autoclaved Fibrecement Sheet to which an Additive has not been Added Water (2500 g), cement (26 g) and quartz flour (20 g) are added in succession to a 5% strength fiber slurry (80 g) while stirring (1500 rpm, 15 minutes). The resulting mixture is subsequently stirred at 1500 rpm for 2 hours. The resulting mixture is filtered through filter paper in a porcelain suction filtration funnel (diameter 10 cm) under a water pump vacuum.

The still moist residue is subsequently distributed in a metal pressing mold and pressed at 170 bar. The resulting fibrecement sheet is detached from the mold and subsequently stored for 2 weeks in an air conditioned chamber. The fibrecement sheet is subsequently autoclaved (12 bar steam, 180° C., 6 h) and again stored for 2 weeks in an air conditioned chamber. The fibrecement sheet obtained has a density of 1.34 g/ml.

Example C7 (not According to the Invention): Production of an Autoclaved Fibrecement Sheet to which Monomeric 1,4,4-Trimethylpentyltriethoxysilane has been Added as Additive Water (2500 g), cement (26 g), quartz flour (20 g) and 1,4,4-trimethylpentyltriethoxysilane (0.1 g) are added in succession to a 5% strength fiber slurry (80 g) while stirring (1500 rpm, 15 minutes). The resulting mixture is subsequently stirred at 1500 rpm for 2 hours. Further processing is carried out as described in Example 6. The fibrecement sheet obtained has a density of 1.38 g/ml.

Example C8 (not According to the Invention): Production of an Autoclaved Fibrecement Sheet to which Monomeric n-OctylTriethoxysilane has been Added as Additive The procedure of Example 7 is repeated, but the 0.1 g of 1,4,4-trimethylpentyltriethoxysilane is replaced by the same amount of n-octyltriethoxysilane. The fibrecement sheet obtained has a density of 1.31 g/ml.

Example 9 (According to the Invention): Production of an Autoclaved Fibrecement Sheet to which Resin 1 has been Added as Additive The procedure of Example 7 is repeated, but the 0.1 g of 1,4,4-trimethylpentyltriethoxysilane is replaced by the same amount of resin 1 from production example 1. The fibrecement sheet obtained has a density of 1.30 g/ml.

Example 10 (According to the Invention): Production of an Autoclaved Fibrecement Sheet to which Resin 2 has been Added as Additive The procedure of Example 7 is repeated, but the 0.1 g of 1,4,4-trimethylpentyltriethoxysilane is replaced by the same amount of resin 2 from production example 2. The fibrecement sheet obtained has a density of 1.32 g/ml.

Example 5: Determination of the Water Absorption of Fibrecement Sheets

The fibrecement sheets obtained in Examples 6 to 10 are dried to constant mass at 40° C. for 24 hours in a drying oven. The water absorption is subsequently determined by means of storage in water under pressure in accordance with DIN EN 520. The results of these measurements are shown in Table 3.

TABLE 3

|  | Example C6* | Example C7* | Example C8* | Example 9 | Example 10 |
|---|---|---|---|---|---|
| Water absorption after 2 h [% by weight] | 30.8 | 21.3 | 21.3 | 2.3 | 2.5 |
| Reduction in the water absorption after 2 h [%] |  | 30.8 | 30.8 | 92.5 | 91.9 |
| Water absorption after 24 h [% by weight] | 34.6 | 25.7 | 25.1 | 5.0 | 5.5 |
| Reduction in the water absorption after 24 h [%] |  | 25.7 | 27.5 | 85.5 | 84.1 |

*not according to the invention

The invention claimed is:

1. An alkyl silicone resin (A) containing at least 80% by weight of units of the formula I $$R^1_a(R^2O)_b R^3_c SiO_{(4-a-b-c)/2} \quad (I)$$

where
R$^1$ are identical or different and are each a monovalent, SiC-bonded, unsubstituted or substituted aliphatic hydrocarbon radical having not more than 4 carbon atoms,
R$^2$ are identical or different and are each a monovalent, unsubstituted or substituted hydrocarbon radical having not more than 4 carbon atoms,
R$^3$ are identical or different and are each a monovalent, SiC-bonded, unsubstituted cyclic, branched, or unbranched alkyl radical having at least 5 carbon atoms,
a is 0, 1, 2 or 3,
b is 0, 1, 2 or 3, and
c is 0, 1 or 2, with the proviso that the sum of a+b+c is less than or equal to 3 and in at least 50% of the units of the formula (I) the sum a+b is 0 or 1 and in at least 20% of the units of the formula (I) c is 1,
where the content of alkoxy groups R$^2$O is 5-20% by weight.

2. The alkyl silicone resin (A) of claim 1, wherein the radicals R$^2$ are selected from the group consisting of methyl radicals, and ethyl radicals, and mixtures thereof.

3. The alkyl silicone resin (A) of claim 1, wherein at least 90 mol % of all radicals $R^1$ are methyl radicals.

4. The alkyl silicone resin (A) of claim 1, which comprises, based on the total number of units of the general formula (I), from 8 to 65% of units of the formula (I) in which b is 0.

5. The alkyl silicone resin (A) of claim 1, which comprises, based on the total number of units of the formula (I), from 30 to 70% of units of the formula (I) in which b is 1.

6. A process for producing an alkyl silicone resin (A) of claim 1, comprising: reacting chlorosilane of the formula (II) alcohol of the formula (III)

   (II)

   (III)

and water,
the reaction taking place in a reaction column in a continuous process, with the alcohol and the water being introduced in the lower part of the column and vaporized there and the alkyl chlorosilane being fed in in the upper part of the column, where $R^1$ are identical or different and are each a monovalent, SiC-bonded, unsubstituted or substituted aliphatic hydrocarbon radical having not more than 4 carbon atoms, $R^2$ are identical or different and are each a monovalent, unsubstituted or substituted hydrocarbon radical having not more than 4 carbon atoms, $R^3$ are identical or different and are each a monovalent, SiC-bonded, unsubstituted or substituted hydrocarbon radical having at least 5 carbon atoms, a is 0, 1, 2 or 3, and c is 0, 1 or 2, with the proviso that c is 1 in at least 20% of the units of the formula (I).

7. The process of claim 6, wherein the radicals $R^2$ are selected from the group consisting of methyl radicals, and ethyl radicals, and mixtures thereof.

8. The process of claim 6, wherein at least 90 mol % of all radicals $R^1$ are methyl radicals.

9. The process of claim 6, which comprises, based on the total number of units of the general formula (I), from 8 to 65% of units of the formula (I) in which b is 0.

10. The process of claim 6, which comprises, based on the total number of units of the formula (I), from 30 to 70% of units of the formula (I) in which b is 1.

11. A process for the bulk hydrophobicization of fibrocement, comprising preparing a mixture containing water, fibers, cement and alkyl silicone resin (A) of claim 1.

12. A process for the bulk hydrophobicization of fibrocement, comprising preparing a mixture containing water, fibers, cement and alkyl silicone resin (A) produced by the process of claim 6.

13. In a process for the bulk hydrophobicization of fibrocement wherein a hydrophobicizing agent is added to an aqueous mixture used to prepare a fibrocement product, the improvement comprising employing an alkyl silicone resin (A) of claim 1 as at least one hydrophobicizing agent.

* * * * *